United States Patent

[11] 3,570,794

| [72] | Inventor | Joseph F. Kirschner<br>Arcadia, Calif. |
|---|---|---|
| [21] | Appl. No. | 754,804 |
| [22] | Filed | Aug. 23, 1968 |
| [45] | Patented | Mar. 16, 1971 |
| [73] | Assignee | Automatic Fire Control, Inc.<br>El Monte, Calif. |

[54] SWAY BRACE FOR PIPING
1 Claim, 3 Drawing Figs.

| [52] | U.S. Cl. | 248/74, 248/62, 248/327 |
|---|---|---|
| [51] | Int. Cl. | F16e3/10 |
| [50] | Field of Search | 248/74, 62, 58, 59, 327, 317, 54, 60 |

[56] References Cited
UNITED STATES PATENTS

| 2,335,833 | 11/1943 | Wood | 248/54 |
|---|---|---|---|
| 2,606,952 | 8/1952 | Cofer et al. | 248/74X |

FOREIGN PATENTS

| 1,055,268 | 1/1967 | Great Britain | 248/74 |

*Primary Examiner*—Chancellor E. Harris
*Attorney*—Allan D. Mockabee

ABSTRACT: A sway brace for fluid lines in building structures such as water supply lines in sprinkler systems, the brace including a brace element having an end adapted to be anchored to a joist or other portion of a building and having its opposite end provided with a U-bolt clamp assembly, the sway brace being disposed at an angle to the horizontal of 0° to 45° and the U-bolt encircling the water pipe to be braced, and the clamps being located on the U-bolts and having portions clampingly engaging the diagonal brace.

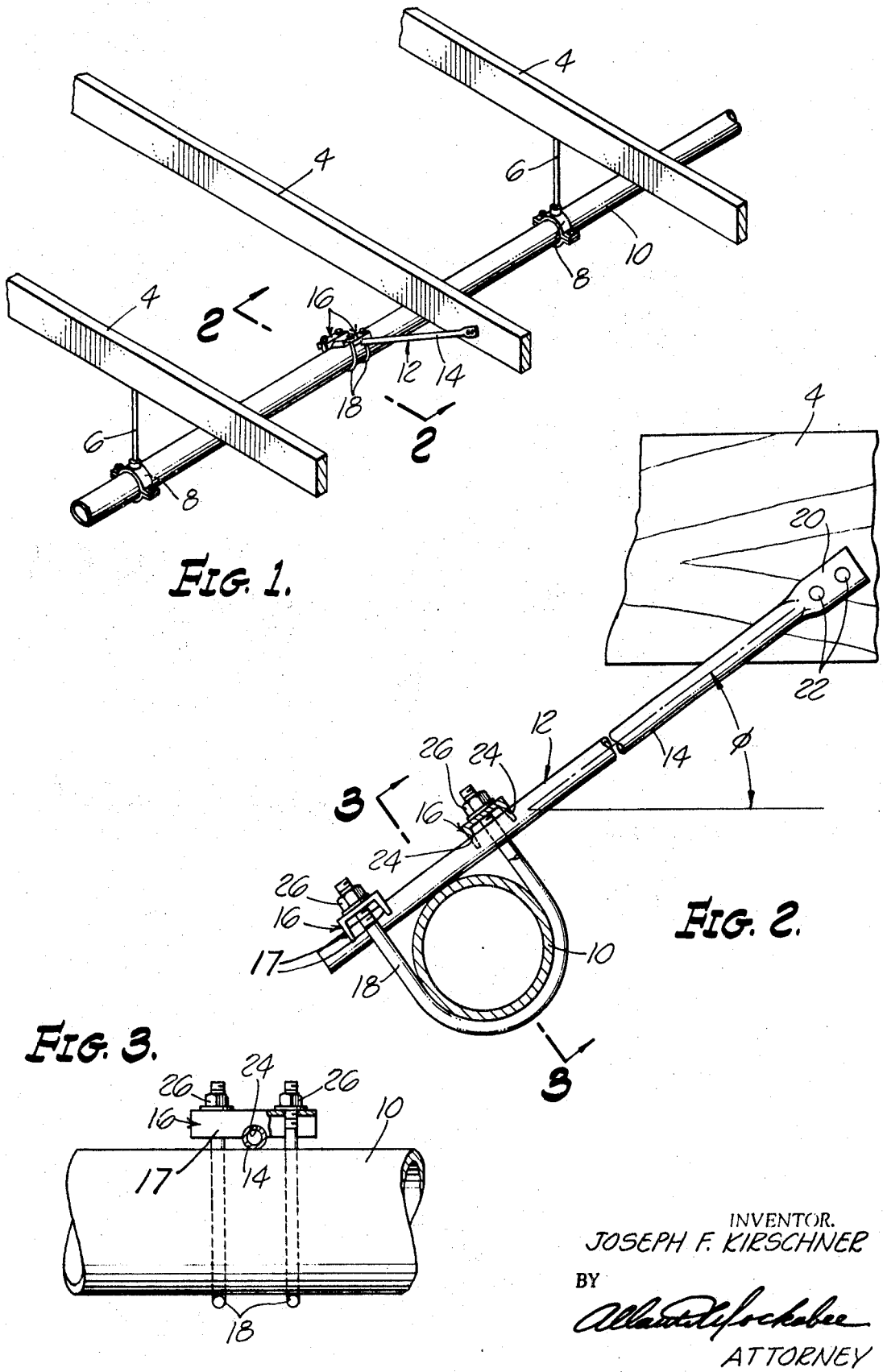

SWAY BRACE FOR PIPING

DISCLOSURE

This invention relates to sway braces, such as are used in building structures to brace fire control water sprinkler distribution pipes against damaging movement due to seismic disturbances.

Where sprinkler systems are used in buildings it is required that the water distribution pipes be adequately braced so that in the event of earthquake, the pipes be adequately braced so that in the event of earthquake, the pipes will not unduly sway relative to adjacent portions of the building structure and separate or produce excessive leakage at the pipe joints.

Various types of sway brace structures have been improvised heretofore. They have included braces in the form of short lengths of tubing or pipe which has been drilled to receive clamps of various types, and other more or less cumbersome or makeshift types of braces have heretofore been relied upon.

It is an object of the present invention to provide a sway brace construction which is simple and economical to manufacture and which can be installed quickly and conveniently in such a way that it will more than adequately brace the pipe against excessive movement during seismic disturbances. It is a structure which can readily be standarized and made in different sizes to accommodate distribution pipes of any conventional diameter.

It is a further object of the invention to provide a sway brace with an efficient types of clamping structure which when clamped at a reasonably required clamping force, will produce adequate and dependable clamping action.

The above and other objects and advantages of the invention will more fully appear from the following description in connection with the accompanying drawing:

FIG. 1 is a perspective view of a section of distribution pipe supported from building joists and braced with one of the sway braces;

FIG. 2 is an enlarged view particularly in side elevation, and particularly in section, taken approximately on the line 2-2 of FIG. 1; and FIG. 3 is a sectional detail taken approximately on the line 3-3 of FIG. 2.

In the drawing there is shown a series of floor joists 4 which conventionally are part of an ordinary building structure. Extending downwardly from spaced joists are pipe hangers 6 including clamps 8 which connect the hangers to a pipe 10. This pipe preferably is part of a distribution system for furnishing water to a plurality of sprinklers which are distributed through the building for fire prevention purposes, as is well known.

Extending between one of the joists 4 and the pipe 10 is a sway brace assembly 12 comprising a brace proper 14, channel shaped clamps 16 and nutted U-bolts 18. The brace 14 is shown disposed at an angle to the horizontal with its upper end 20 secured to the joist 4 by suitable fasteners 22. The angle of the brace 14 to the horizontal is ordinarily required to be between 0° to 45°. This brace is not intended to provide the support for the pipe since support is dependent upon the hangers 6. The brace is intended to prevent the pipe from swaying transversely of its axis, a movement which might occur during earthquakes and which is not prevented by the hangers 6. It has been found that a diagonal disposition of the brace 14 is desirable for the bracing function it is intended to produce.

The brace 14 is connected to the pipe 10 by the clamps 16 and U-bolts 18. It is seen in FIG. 3 that each of the clamps 16 is provided with a semicircular cutout 24 to receive the brace 14. Through each clamp 16 passes an end of each of the two U-bolts 18, and each bolt then passes around the water distribution pipe 10 and through the other clamp 16. Then when the nuts 26 on the U-bolts are tightened, the bolts will tighten about the pipe 10 and cause the clamps 16 to tightly engage the brace 14, the engagement being through the webs 17 of said clamps. Not only do the clamps 16 tightly grip the brace 14, but the same force which causes the gripping action also causes the U-bolts 18 to tightly grip the pipe 10. Additionally, the brace 14 is tightly gripped between the members 16 and the pipe 10. Thus, the clamping structure very efficiently ties the brace 14 to the pipe 10.

By reason of the diagonal disposal of the brace 14, any tendency of the pipe 10 to swing generally horizontally produces a snubbing action of the U-bolts 18 about the pipe 10 and this snubbing action further increases the gripping of the pipe by the U-bolts and the gripping of the brace 14 by one of the clamps 16. As viewed in FIG. 2, if the pipe 10 were to tend to swing to the left, the snubbing action of the bolts 18 will cause increased gripping action of the upper clamp 16. If the pipe tended to swing to the right, the snubbing action would be reversed and the increased gripping action would occur between the lower clamp 16 and the brace 14.

For different diameters of pipe within reasonable limits, it would be necessary only to provide U-bolts of different sizes. However, when the diameter of the water pipe is increased considerably, it would be desirable to provide larger and stronger clamps, as well as U-bolts.

From the foregoing it will be seen that I have provided a sway brace construction which is economical to manufacture and which is highly efficient in operation and which can be installed quickly and conveniently. It eliminates costly handwork, such as drilling of holes in the brace 14 and other expensive time-consuming operation, such as is required with makeshift brace constructions. It is a construction that provides highly efficient gripping action wherein the clamps will set in a firm gripping position and will not slip on the diagonal brace until forces are encountered which are far beyond those anticipated.

It should be understood that various changes can be made in the form, details, arrangement and proportions of the parts without departing from the spirit of the invention.

I claim:

1. A sway brace assembly for connection between a portion of a building structure and a suspended fluid supply pipe to prevent damage to the pipe from seismic disturbances wherein the improvement comprises: an elongated longitudinally rigid one-piece cylindrical combined tension and compression brace element having a relatively free end and having its opposite end flattened for convenient anchoring to a portion of a building structure at an angle to the horizontal of between 0° and 45°, a clamp comprising a pair of channel members, each having two spaced webs lying transversely of and gripping said brace element, the channel members being spaced along the brace element, and a pair of U-bolts for the pair of channel members, the ends of each U-bolt being secured to one each of the pair of channel members, the channel members engaging the brace element between opposite ends of the U-bolts, and said U-bolts being adapted to lie about and grip a fluid supply pipe and exert a snubbing action about the pipe by reason of the angular disposition of the brace element to increase the clamping effect of said clamp.